(12) United States Patent
Bass

(10) Patent No.: US 7,895,837 B2
(45) Date of Patent: Mar. 1, 2011

(54) DIFFERENTIAL HYDRAULIC MASTER CYLINDER

(75) Inventor: Richard Arnold Bass, Warwickshire (GB)

(73) Assignee: AP Racing Limited, Coventry (GB)

( * ) Notice: Subject to any disclaimer, the term of this patent is extended or adjusted under 35 U.S.C. 154(b) by 476 days.

(21) Appl. No.: 12/072,419

(22) Filed: Feb. 25, 2008

(65) Prior Publication Data
US 2008/0236161 A1  Oct. 2, 2008

(51) Int. Cl.
*F15B 7/04* (2006.01)
(52) U.S. Cl. ...................................... 60/578
(58) Field of Classification Search ............. 60/578
See application file for complete search history.

(56) References Cited

U.S. PATENT DOCUMENTS

| 2,031,360 A | 2/1936 | Boughton |
| 2,986,886 A * | 6/1961 | Funk et al. ............... 60/578 |

FOREIGN PATENT DOCUMENTS

| DE | 2336207 A1 | 1/1975 |
| FR | 1301599 A | 8/1962 |
| JP | 59048253 A | 3/1984 |
| JP | 60000265 U | 1/1985 |
| JP | 61033349 A | 2/1986 |

* cited by examiner

*Primary Examiner*—F. Daniel Lopez
(74) *Attorney, Agent, or Firm*—Chernoff Vilhauer

(57) ABSTRACT

A differential hydraulic master cylinder (10) has a cylinder body (12) in which is provided a larger diameter first chamber (18) and a smaller diameter second chamber (20). A first fluid passageway (60, 74, 78, 80) connects the first chamber (18) with a source of ambient pressure and contains a pressure relief valve (70) for connecting the first chamber with said source of ambient pressure when the pressure in the first chamber reaches a threshold value. A second fluid passageway (76, 78, 80, 82) connects the first chamber (18) with an outlet (11) and the second chamber (20). A non-return valve (72) is located in the second passageway to prevent hydraulic fluid from flowing from the second chamber (20) to the first chamber (18) at least when the pressure relief valve (70) is open. The non-return valve (72) and the pressure relief valve (70) each have a movable valve member (100, 102, 88; 122) which are mechanically interconnected.

17 Claims, 2 Drawing Sheets

DIFFERENTIAL HYDRAULIC MASTER CYLINDER

RELATED APPLICATIONS

Figure 1:
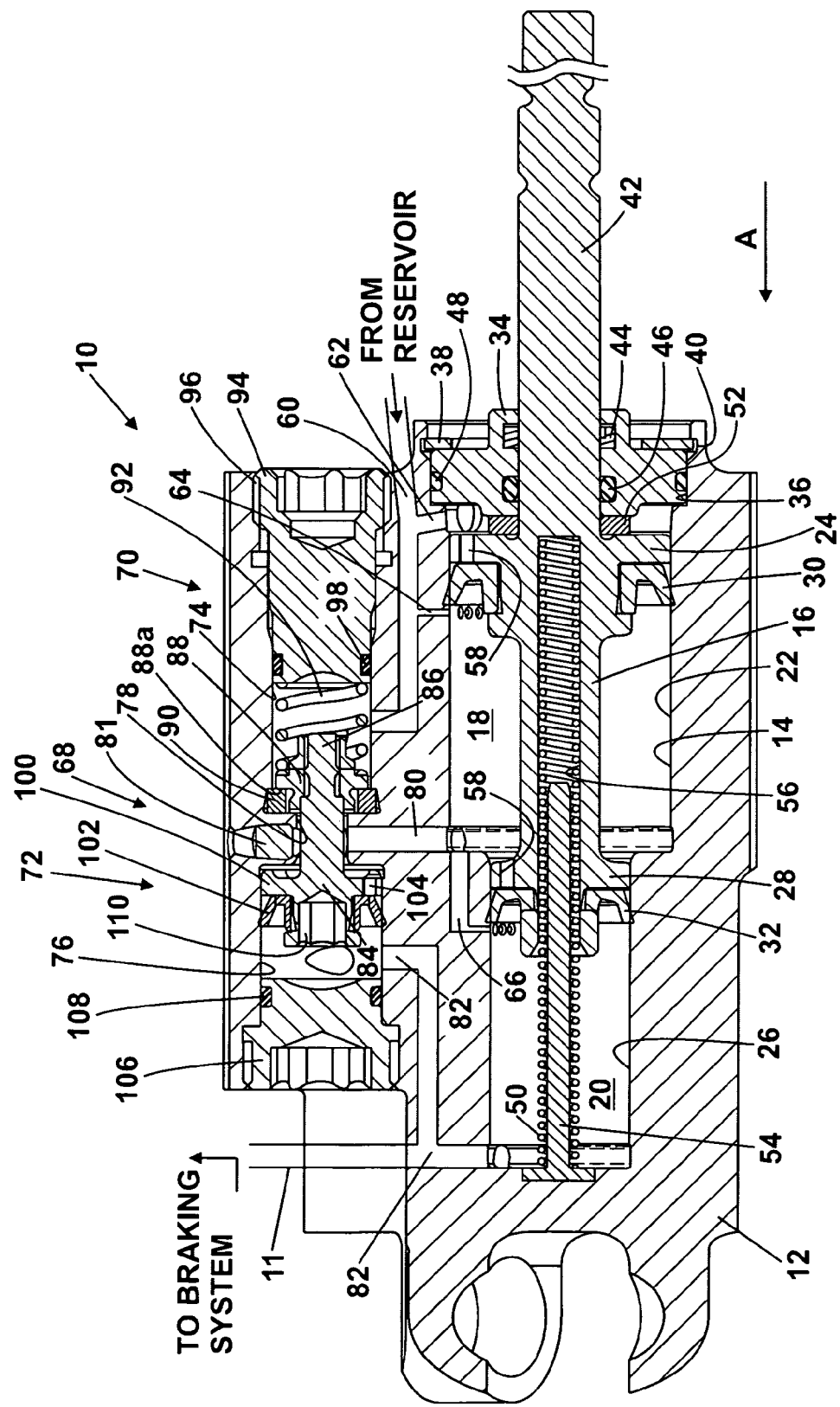

This application claims priority from UK application GB 0704431.6, filed Mar. 8, 2007.

BACKGROUND AND SUMMARY OF THE INVENTION

The present invention relates to a differential hydraulic master cylinder and in particular, but not exclusively, to a differential hydraulic master cylinder for use with a vehicle braking system. The invention also relates to a vehicle brake circuit comprising such a differential hydraulic master cylinder.

When hydraulic brakes are applied, it is first necessary to take up any play or slack in the system before a braking force is applied by the brake actuators. For example, where the braking system comprises disc brakes, the pistons in the disc brake calipers are retracted into the calipers when the brakes are not being applied to ensure that the pads do not rub on the discs, this is known as fall back. When the brakes are applied, it is first necessary to advance the pistons to bring the pads into contact with the discs before any braking force can be generated. During the initial phase of brake application, it is desirable to move a large volume of hydraulic fluid over a relatively short travel to take up any play. This is best achieved by using a large diameter piston and cylinder arrangement in the master cylinder. However, the use of a large diameter piston and cylinder means the greater pedal effort is required to produce the high pressures necessary to generate the desired braking forces.

To overcome the above problem, differential brake master cylinders have been developed which have a first larger diameter chamber to supply large volumes of hydraulic fluid at low pressure to take up play during the initial stages of brake application and a second smaller diameter chamber to supply hydraulic fluid at high pressure during the later stages of brake operation. By suitable design, a differential master cylinder can be configured to reduce the overall travel required to apply the brakes whilst at the same time keeping the pedal force required within acceptable limits.

In most differential master cylinders, the larger diameter chamber is formed by means of a larger diameter piston located in a larger diameter cylinder and the smaller diameter chamber is provided by means of a smaller diameter piston in a smaller diameter cylinder. The two pistons may be integrally formed as a stepped piston or they may be separate pistons and the two cylinders may be formed as a stepped bore.

During operation of a differential master cylinder, it is necessary to switch from the larger diameter chamber being operative to the smaller diameter chamber once the free play in the brake system has been taken up and the hydraulic pressure starts to rise. This is usually achieved by means of a pressure relief valve arrangement which opens to connect the larger diameter chamber with a source of ambient pressure once the fluid pressure in the larger diameter chamber reaches a pre-determined value. Conveniently, the valve is located in a fluid passageway that connects the larger diameter chamber with a fluid reservoir. The fluid passageway may be located entirely in the body of the master cylinder or at least a part of the fluid passageway in which the valve is located may extend through the piston.

Since both working chambers in a differential brake master cylinder are fluidly connected with the brake line, it is also necessary to incorporate a second valve arrangement to enable fluid from the larger chamber to reach the brake line but which prevents fluid passing back into the larger diameter chamber once the pressure relief valve has opened. In some known arrangements, the fluid displaced from the larger diameter chamber flows through ducts in the smaller diameter piston and over a lip seal on the piston to enter the smaller diameter chamber and the brake line. Once the pressure relief valve has opened, the lip seal is pushed firmly into contact with the wall of the cylinder to prevent hydraulic fluid passing backwards over the seal into the larger chamber. However, the lip seal can be slow to respond, which increases the transition period. To avoid this problem, it is known to connect the larger working chamber with the brake line by means of a fluid passageway and to provide a one-way valve in the passageway to prevent fluid from flowing back into the larger chamber once the pressure relief valve has opened. In some known arrangements, the fluid passageway is formed through the smaller piston so that the fluid enters the brake line via the smaller diameter chamber. In other known arrangements, the fluid passageway is provided in the body of the master cylinder.

An example of a differential brake master cylinder in which the pressure relief valve and a non-return valve are both located in the piston assembly is described in International patent application publication No. WO 2004/022398 to Freni Brembo S.P.A. Whereas, U.S. Pat. No. 4,455,831 A, assigned to Akebono Brake Industry Co., Ltd., describes a differential brake master cylinder in which the pressure relief valve is located in a fluid passageway formed in the body of the master cylinder whilst a non-return valve is located in the piston assembly.

To ensure a smooth transition from the larger diameter chamber to the smaller diameter chamber, it is essential that both the pressure relief valve and the non return second valve operate simultaneously. It is also desirable that the pressure relief valve opens quickly and smoothly once the predetermined pressure has been reached and that the valve does not oscillate. This is a problem in all differential master cylinders but can be a particular issue where the valves are located in the piston assembly, where the size of the valves is necessarily restricted.

There is a need therefore, for an improved differential brake master cylinder which overcomes, or at least mitigates the above mentioned problems.

In accordance with a first aspect of the invention, there is provided a differential hydraulic master cylinder having a cylinder body in which is provided a first working chamber and a second working chamber, the second working chamber having a smaller diameter than the first, the cylinder further having a first fluid passageway for fluidly connecting the first chamber with a source of ambient pressure and a pressure relief valve in the first passageway which is arranged to open to connect the first chamber with said source of ambient pressure when the pressure in the first chamber reaches a threshold value, and a second fluid passageway for fluidly connecting the first chamber with an outlet, a non-return valve located in the second passageway which is arranged to permit hydraulic fluid to flow from the first chamber to the outlet but to prevent hydraulic fluid from flowing in the reverse direction, at least when the pressure relief valve is open, in which the non-return valve and the pressure relief valve each comprise a movable valve member, the movable valve members of the two valves being mechanically interconnected.

The mechanical interconnection may be adapted to transfer forces between the movable valve members.

The mechanical interconnection may be a substantially rigid link between the movable valve members. The movable valve members may be provided on a common valve spool.

The master cylinder may be configured so that, in use, when the pressure relief valve begins to open, a pressure differential is created across the movable member of the non-return valve, which pressure differential generates a force on the movable member of the non-return valve that is transmitted to the movable member of the pressure relief valve through the mechanical interconnection and which tends to move the movable member of the pressure relief valve in a direction to fully open the pressure relief valve.

The master cylinder may be configured so that, in use, the pressure relief valve is held open so long as the pressure differential across the movable member of the non-return valve is equal to or larger than the threshold value.

The whole of the first and second fluid passageways may be provided in the cylinder body.

The pressure relief valve may include the movable valve member and a corresponding seal member in the first fluid passage, the valve being configured so that, in use, the movable valve member is movable from a closed position in which it contacts the corresponding seal member to close the first fluid passage and an open position in which it is spaced from the corresponding seal member. The corresponding seal member may be a resilient ring seal mounted in a first valve chamber forming part of the first fluid passageway and the movable valve member may be substantially rigid.

In one embodiment, the non-return valve movable member comprises a piston located in a second valve chamber which forms part of the second fluid passageway, the piston carrying a lip seal for contact with the surface of the second valve chamber, the arrangement being such that, in use, fluid is able to flow from the first working chamber over the lip seal to the outlet but is prevented from flowing in the reverse direction by engagement of the lip seal with the surface of the second valve chamber.

In an alternative embodiment, the non-return valve comprises the movable valve member and a corresponding seal member in the second fluid passage, the non-return valve being configured such that, in use, the movable valve member is movable from a closed position in which it contacts the corresponding seal member to close the second fluid passage and an open position in which it is spaced from the corresponding seal member. The corresponding seal member in this embodiment may be a resilient ring seal mounted in a second valve chamber forming part of the second fluid passageway and the movable valve member may be substantially rigid.

The hydraulic master cylinder may be configured so that movable member of the pressure relief valve is in sealing contact with its corresponding seal member to close the first fluid passageway when the movable member of the non-return valve is spaced from its corresponding seal member and vice versa.

The pressure relief valve may comprise a valve spring which biases the movable member into a valve closed position, the threshold pressure at which the valve opens being determined by the spring force exerted by the valve spring. The spring force may be adjustable. The spring may react against a closure member which is adjustably mounted in the cylinder body to vary the spring force. The master cylinder may have a mechanism configured to enable the threshold pressure to be adjusted remotely from the master cylinder.

The differential hydraulic master cylinder in accordance with the first aspect of the invention may comprise first and second valve chambers in the cylinder body fluidly interconnected by a bore, the first valve chamber forming part of the first fluid passageway and the second valve chamber forming part of the second fluid passageway, the cylinder further including a valve spool extending through the bore into each of the first and second valve chambers, the valve spool carrying the movable valve member of the pressure relief valve within the first valve chamber and the movable valve member of the non-return valve within the second valve chamber, the valve spool being movable in an axial direction from an initial position in which the pressure relief valve movable member contacts a seal in the first valve chamber to close the first fluid passage to a position in which the pressure relief valve member is spaced from the seal and the first fluid passage is open, the valve spool being biased to the initial position by a valve spring. In which case, the movable valve member of the non-return valve may be a piston mounted to or integral with the valve spool, the piston carrying a lip seal for contact with the surface of the second valve chamber, the arrangement being such that, in use, fluid is able to flow over the lip seal to the outlet but is prevented from flowing in the reverse direction by engagement of the lip seal with the surface of the second valve chamber. Alternatively, the non-return valve may comprise the movable valve member and a corresponding seal member in the second valve chamber, the non-return valve being configured such that in use, the movable valve member is movable from a closed position in which it contacts the corresponding seal member to close the second fluid passage and an open position in which it is spaced from the corresponding seal member so that a flow path through the second fluid passage is opened. The corresponding seal member may be a resilient ring seal. The movable valve member of the non-return valve may be spaced from its corresponding seal member when the valve spool is in its initial position. In this embodiment, the first valve chamber may be closed at one end by a closure member which is adjustably mounted to the cylinder body, the valve spring reacting between the closure member and the valve spool, the arrangement being such that the spring force applied by the valve spring to the valve spool can be varied by adjusting the position of the closure member within the cylinder body.

In a hydraulic master cylinder in accordance with the first aspect of the invention, the first and second working chambers may be defined by means of a stepped bore in the cylinder body and a piston assembly, the piston assembly having a larger diameter piston portion received in a correspondingly sized larger diameter portion of the stepped bore to define the first working chamber and a smaller diameter piston portion received in a correspondingly sized smaller diameter portion of the stepped bore to define the second working chamber. In which case, at least part of the first and second fluid passageways, the pressure relief valve and the non-return valve may be provided in the piston assembly.

A differential hydraulic master cylinder in accordance with the first aspect of the invention may be adapted for use in a vehicle braking system.

In accordance with a second aspect of the invention, there is provided a vehicle braking system comprising a hydraulic master cylinder in accordance with the first aspect of the invention.

Figure 2:
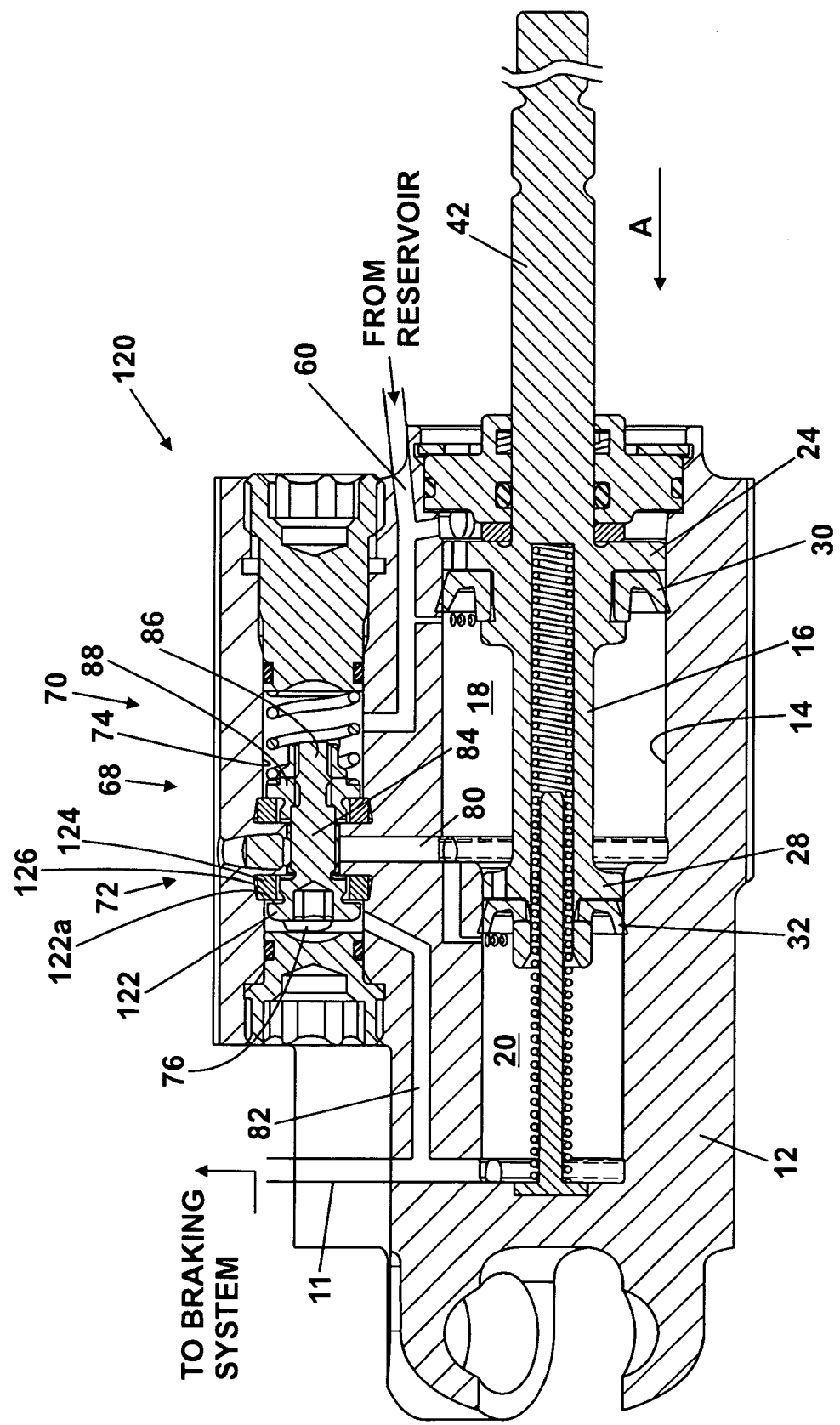

Two embodiments of a hydraulic master cylinder in accordance with the first aspect of the invention will now be described, by way of example only, with reference to the accompanying drawings, in which:

FIG. 1 is a longitudinal cross sectional view through a first embodiment of a differential hydraulic master cylinder in accordance with the invention; and, FIG. 2 is a view similar to that of FIG. 1 but showing a second embodiment of a differential hydraulic master cylinder in accordance with the invention.

With reference initially to FIG. 1, there is shown a first embodiment of a differential hydraulic master cylinder 10 in accordance with the invention.

In the present embodiment, the master cylinder 10 forms part of a hydraulic braking system (not shown) for a vehicle and has an outlet to which a brake line 11 can be attached to fluidly connect the master cylinder with one or more brake actuators (not shown). The master cylinder can be used with any suitable hydraulic braking system but will typically be used in a braking system which incorporates disc brakes. Master cylinders 10 in accordance with the invention are particularly suitable for use with braking systems on racing vehicles, though the invention is not limited to this application.

The hydraulic master cylinder 10 has a cylinder body 12 in which is formed a stepped, cylindrical blind bore 14 which defines in association with a stepped piston assembly 16 two working chambers 18, 20. A first working chamber 18 is defined by a larger diameter portion 22 of the stepped bore 14 in conjunction with a correspondingly larger diameter piston portion 24 of the stepped piston assembly 16. A second of the working chambers 20 is defined by the smaller diameter portion 26 of the stepped bore together with a correspondingly smaller diameter piston portion 28. As will be described in more detail later, both of the working chambers 18, 20 are fluidly connected via an outlet with the brake line 11 which operatively connects the master cylinder with one or more brake actuators (not shown).

Each of the piston portions 24, 28 is slightly smaller in diameter than its respective portion 22, 26 of the stepped bore and carries a lip seal 30, 32. The lip seals engage with the surface of bore to prevent hydraulic fluid from flowing back over the seals when the piston portions 24, 28 are advanced in the direction of arrow A in FIG. 1 to actuate the brakes. An annular closure member 34 is located in a recess 36 at the open end of the larger diameter portion 22 of the stepped bore and is held in place by means of a spring clip 38 which engages in a groove 40. The piston assembly 16 comprises an integral actuation rod 42 which extends through the annular closure member for connection with an actuation system by means of which a driver of the vehicle can advance the piston assembly 16 along the bore 14 to actuate the brakes in a known manner. Typically, the actuation system will comprise a brake pedal (not shown) which is pushed by a driver's foot to actuate the brakes but the actuation system could comprise a hand operated lever or any other suitable mechanism instead. The actuation rod 42 is supported in the annular closure member by a bearing 44 and seals 46, 48 are provided on the closure member 34 to prevent hydraulic fluid from leaking between the member 34 and the actuation rod 42 or between the member 34 and the base of the recess 36.

A return spring 50 is operative between the cylinder body 12 and the piston assembly 16 to bias the piston in a brake release direction, which is in the opposite direction to that of arrow A, when the brakes are not being actuated. A shim 52 is mounted about the actuation rod 42 between the closure member 34 and a rear face of the large diameter piston portion 24 to limit movement of the piston assembly in the brake release direction to a fully released position as shown in FIG. 1. Shims 52 of different thicknesses can be used to adjust the travel of the piston in the brake release direction. The return spring 50 is mounted about a rod 54 attached to the closed end of the stepped bore 14 and is received in an axial blind bore 56 in the piston assembly 16. One or more bores 58 extend through each of the large and small diameter piston portions 24, 28, through which hydraulic fluid is able to pass when the piston assembly 16 is being moved by the return spring in the brake release direction. Although not shown in the drawing, thin metallic washers may be positioned between the lip seals 30, 32 and their respective piston portions 24, 28 to prevent the seals being extruded into the bores 58 when the brakes are being applied and the fluid in the working chambers 18, 20 is pressurised.

A first duct 60 in the cylinder body 12 is in fluid connection with a hydraulic fluid reservoir (not shown). A bore 62 fluidly connects the first duct with a region of the large diameter portion 22 of the stepped bore which is to the rear of the large diameter piston portion 24, even when the piston assembly is in the fully released position as shown. An inlet port 64 connects the first duct 60 with the larger diameter portion 22 of the bore 14 at a position which is just in front of the lip seal 30 on the larger diameter piston portion 24 when the piston assembly 16 is in the fully released position. Hydraulic fluid is able to enter the first chamber 18 through the inlet port 64 when the piston assembly 16 is in the fully retracted position to replenish losses in the system. A transfer port 66 interconnects the first and second chambers 18, 20 and opens into the second chamber 20 at a position just forward of the lip seal 32 on the smaller diameter piston portion 28 when the piston assembly is in the fully released position. Hydraulic fluid is able to pass through the transfer port 66 to from the first chamber 18 to the second chamber 20 to replenish losses when the brakes are not being applied.

A switch-over valve arrangement, indicated generally at 68, is provided in the cylinder body 12 to change over from the first chamber 18 being operative to the second chamber 20 being operative during brake application once the hydraulic pressure in the first chamber reaches a pre-determined threshold value. The switch-over valve arrangement comprises a pressure relief valve 70 and a second valve 72 which are mechanically interlinked. The second valve 72 is operative to prevent fluid flowing from the second working chamber 20 back into the first working chamber 18 or the reservoir when the pressure relief valve is open.

The pressure relief valve 70 is located in a first valve chamber 74 formed in the cylinder body 12, whilst the second valve 72 is located in a second valve chamber 76 also formed in the cylinder body 12, in axial alignment with the first valve chamber 74. The operative portion of the first valve chamber 74 has a smaller diameter than that of the second valve chamber 76. The two valve chambers 74, 76 are fluidly interconnected by means of a smaller diameter axial bore 78 and are fluidly connected with the first working chamber 18 by means of a duct 80 which opens into the axial bore 78. An outer end of the duct 80 is closed by means of a plug 81.

The first duct 60 opens into the first valve chamber 74, so that the first valve chamber 74 forms part of a first fluid passageway connecting the first working chamber 18 with the fluid reservoir, the first passageway including the duct 80 between the first working chamber 18 and the axial bore 78, the axial bore 78, the first valve chamber 74 and the first duct 60.

The second valve chamber 76 is fluidly connected with the second working chamber 20 and with the outlet and brake line 11 by means of a further duct 82 in the cylinder body 12. The second valve chamber thus forms part of a second fluid passageway connecting the first working chamber with the outlet and which comprises the duct 80, the axial bore 78, the second valve chamber 76 and the further duct 82. The outlet will typically comprise a port having a screw threaded connection to which the brake line 11 can be attached in the usual manner. The term "outlet" is used here as a convenient way to define the connection between the master cylinder and the brake line 11, though it will be understood that brake fluid can flow in both directions into and out off the brake line 11 though the outlet.

The switch-over valve arrangement includes a valve spool 84 having an axial main body portion 86 which extends through the axial bore 78 into both the first valve chamber 74 and the second valve chamber 76. A rigid pressure relief valve member 88 is mounted to the main body portion of the valve spool within the first valve chamber 74 by means of a screw thread or any other suitable method. The pressure relief valve member 88 has an annular flange which projects radially outwardly on which is formed an axial sealing face 88a. The sealing face 88a on the pressure relief valve member 88 is arranged to contact and make a seal with an annular flexible seal 90 mounted in a groove at the inner end of the first valve chamber 74 when the valve spool 84 is in an initial position, as shown in FIG. 1, to close the first fluid passageway.

The valve spool 84 is biased to the initial position by means of a helical coil spring 92 which is operative between the pressure relief valve member 88 and an adjustable closure member 94 mounted in the outer end of the first valve chamber 74 by means of a screw thread 96. The closure member 94 carries a seal 98 to prevent hydraulic fluid from leaking between the closure member 96 and the chamber walls. The axial position of the closure member 94 in the cylinder body 12 can be adjusted by screwing the closure member in or out to adjust the spring force applied by the spring 92 to the pressure relief valve member 88 and hence the threshold pressure at which the pressure relief valve opens.

A second valve piston 100 is formed integrally at the end of the valve spool main body 86 which is located in the second valve chamber 76. The second valve piston 100 is slightly smaller in diameter than the second valve chamber and carries a lip seal 102 which faces away from the piston and engages with the surface of the second valve chamber 76 to prevent fluid from flowing past it towards the axial bore 78 and the first working chamber 18 in the manner of a non-return valve. A number of bores 104 are formed axially through the second valve piston 100 through which fluid can flow over the lip seal 102 to enter the second valve chamber 76, duct 82 and the brake line 11. With the valve spool 84 in its initial position, the second valve piston 100 is spaced axially from the inner end of the second valve chamber 76 so that the piston 100 and valve spool 84 can move axially to the right, as shown, to open the pressure relief valve 70 as will be described below. The second valve piston 100 and the valve lip seal 102 can be considered a movable valve member of the second valve 72.

The second valve chamber 76 is closed at its outer end by a further closure member 106 which is in screw threaded engagement with the cylinder body 12. The further closure member 106 carries a seal 108 which contacts the inner surface of the second valve chamber to prevent fluid leaking past the closure member 106.

In the embodiment as described, the switch over valve spool assembly 84 can be extracted by removing the two closure members 94, 106 and the valve spring 92. The pressure relief valve member 88 can then be disassembled from the valve spool main body 86 and extracted through the first valve chamber 74 whilst the valve spool main body 86 is removed through the second valve chamber 76. As shown in FIG. 1, the valve spool main body 86 may be provided with formations 110 for co-operation with a tool to help in disassembling the pressure relief valve member 88. It will be appreciated, however, that the valve spool 84 can be constructed in a variety of different ways. For example, both the pressure relief valve member 88 and the second valve piston 100 could be formed as separate members mounted to the valve spool main body 86 or the second valve piston 100 could be formed as a separate component mounted to the main body 86 with the pressure relief valve member 88 being formed integrally. Numerous other arrangements for forming the switch-over valve arrangement 68 with a mechanical interconnection between the pressure relief valve member and the second valve member will be apparent to those skilled in the art.

Operation of the differential brake master cylinder 10 will now be described.

With the piston assembly 16 in the fully released position as shown in FIG. 1, both working chambers 18, 20 are fluidly connected with the fluid reservoir and the system is at ambient pressure. The valve spool 84 and the pressure relief valve member 88 are biased to the initial position by the valve spring 50 so that the pressure relief valve 70 is closed.

When the vehicle driver applies the brakes, the piston assembly 16 is moved in the direction of arrow A to advance along the stepped bore 14. Once the lip seal 30 on the large piston 24 has advanced beyond the inlet port 64 and the lip seal 32 on the smaller piston has advanced beyond the transfer port 66, the first and second working chambers 18, 20 are hydraulically isolated from the reservoir and the pressure in the chambers 18, 20 and the brake line 11 starts to build.

During an initial stage of brake application, the pressure in the working chambers 18, 20 and the brake line 11 remains fairly low as the play in the system is taken up. In this phase, a large volume of fluid is displaced from the first working chamber 18 to ensure that the play is taken up over a relatively short stroke of the piston assembly 14. The fluid displaced from the first working chamber 18 flows along second fluid passageway 80, 78, 76, 82 through the one-way second valve 72 to enter the brake line 11.

Once the play in the system has been taken up, for example when the pistons in any associated brake calipers have been advanced to bring the brake pads into contact with the brake discs and any air in the system has been compressed, the fluid pressure in the working chambers 18, 20 and the brake line 11 will start to rise rapidly as a braking force is generated. Once the pressure in the first working chamber 18 reaches a predetermined threshold value indicative that the play has been taken up, the fluid pressure acting on the pressure relief valve member 88 applies a force to the valve spool 84 which is sufficient to overcome the spring force applied by the valve spring 92 and the valve spool is moved to the right, as shown. Once the valve spool 84 is moved sufficiently that there is a gap between the sealing faces of the pressure relief valve member 88 and the seal 90, the first fluid passageway, including the axial bore 78 between the first and second valve chambers, is opened putting the first working chamber 18 in fluid connection with the reservoir. Once pressure relief valve 70 begins to open and the fluid pressure in the axial bore 78 falls, a pressure differential is created across the one-way valve piston 100 and lip seal 102. This pressure differential generates a force tending to bias the valve spool 84 to the right, as shown, against the bias force of the valve spring helping to open the pressure relief valve 70 quickly and holding the relief valve open for the remainder of the brake application process.

With the pressure relief valve 70 open, the pressure in the first working chamber 18 is reduced to ambient pressure and the fluid pressure to apply the brakes is produced solely by the second, smaller diameter working chamber 20. The second working chamber 20 is dimensioned so as to be capable of generating a sufficiently high fluid pressure to obtain the desired braking forces without requiring excessively high pedal effort. Fluid from the second working chamber 20 is prevented from flowing back along the second fluid passageway 80, 78, 76, 82 by the lip seal 102 which is forced into contact with the surface of the second valve chamber 76, so that the second working chamber 20 and the brake line 11 are fluidly isolated from the first working chamber 18 and those parts of the hydraulic circuit that are at ambient pressure.

Brake application continues for so long as the driver applies a brake application force to the piston assembly 16. When the driver removes the brake application force from the piston assembly 16, it is biased in the brake release direction by the return spring 50 and by the fall-back of the brake caliper pistons. As the piston assembly 16 moves back towards the fully released position, the pressure relief valve 70 remains open until the pressure acting on the second valve piston 100 and lip seal 102 inside the second valve chamber 76 falls below the threshold value and the valve spring 92 is able to move the valve spool 84 to the initial position to close the pressure relief valve 70 and the first fluid passage. As the piston assembly 16 moves in the brake release direction, fluid is able to flow through the bores 58 in the piston portions 24, 28 over the lip seals 30, 32. When the piston assembly 16 is returned to the fully released position, the inlet and transfer ports 64, 66 are uncovered and both working chambers 18, 20 are once again fluidly connected with the reservoir and at ambient pressure.

A further embodiment of a differential brake master cylinder 120 in accordance with the present invention is shown in FIG. 2. The same reference numerals are used to denote components that are the same as or which serve the same function as those in the first embodiment 10.

The brake master cylinder 120 in accordance with the second embodiment is essentially the same as the first embodiment 10 with the exception of the second valve 72 used to isolate the second working chamber from the first working chamber and the reservoir when the pressure relief valve is opened. In this embodiment, the second valve 72 comprises a movable valve member 122 formed integrally at the end of the valve spool main body 86 which is located in the second valve chamber 76. The second valve member 122 has a radially extending flange with an axial sealing surface 122a which is arranged to contact and form a seal with a resilient, annular seal 124 mounted in a groove 126 at the inner end of the second valve chamber 76 when the second valve is closed. With the valve spool 84 in its initial position as shown in FIG. 2, in which the pressure relief valve 72 is closed, the sealing surface 122a of the second valve member is spaced from the resilient seal 124 and fluid is able to flow through the second fluid passageway from the first working chamber 18 to the brake line 11 between the second valve member 122 and the seal 124. During actuation of the brakes, when the pressure of the fluid in the first working chamber 18 reaches the threshold level, the pressure acting on the inner face of the relief valve member 88 moves the valve spool 84 to the right as shown to open the pressure relief valve 70. Once the pressure relief valve starts to open, the pressure in the first working chamber 18, the duct 80, and the axial bore 78 between the first and second valve chambers 74, 76, falls so that a pressure differential is created across the lion-return valve member 122. This pressure differential generates a force on the valve spool 84 which moves the valve spool to the right, as shown, to fully open the pressure relief valve 70 and to bring the second valve member 122 into contact with the seal 124 so closing the second valve and the second fluid passageway. As with the first embodiment, the pressure differential across the second valve member 122 holds the pressure relief valve 70 open for the remainder of the brake application process.

The differential master cylinder 120 in accordance with the second embodiment is otherwise the same as and operates in a similar manner to the first embodiment 10 and the reader should refer to the description of the first embodiment above for details.

It is a particular advantage of the differential master cylinder 10, 120 in accordance with the invention that the second valve 72 and the pressure relief valve 70 are mechanically and operatively linked so that the force applied to the second valve piston 100 or second valve member 122 when the pressure relief valve 70 starts to open is used to assist in fully opening the pressure relief valve and to hold it open for the remaining stages of the brake application process. This helps to ensure that the pressure relief valve 70 opens quickly and reliably once the threshold pressure has been reached. Holding the pressure relief valve 70 open also improves the efficiency of the master cylinder as the first working chamber 18 remains at ambient pressure throughout the whole of the remaining brake application phase. In contrast, in prior art differential brake master cylinders with separate pressure relief and non-return valve arrangements, the pressure relief valve tends to close once the pressure in the first working chambers falls towards or below the threshold value so that there is always a residual pressure in the first working chamber which must be overcome to advance the piston assembly.

In the second embodiment, the mechanical interlinking of the movable valve members 88, 122 of the pressure relief valve 70 and the second valve 72 also ensures that both valves operate at the same time.

Because the switch-over valve arrangement 68 in the present embodiments is provided in the body 12 of the master cylinder rather than in the piston assembly, the valves 70, 72 can be made larger and can incorporate rubber or elastomeric seals 86, 102, 124, which makes them more reliable in operation. A further advantage of providing the switch-over valve assembly 68 in the master cylinder body 12 is that the pressure relief valve 70 can be made adjustable. Typically, the pressure relief valve 70 will we configured to open at a threshold pressure in the range 50-100 PSI (344.7-689.5 KPa) and the actual threshold value can be adjusted by screwing the closure member 94 in or out to vary the force applied by the valve spring 92 to the pressure relief valve member 88 and the valve spool 84. This enables the master cylinder to be fine tuned to suit any particular vehicle set up, the conditions and the driver's preferences. The present embodiments also enable the valve spring 92 to be replaced easily so that differently rated springs can be used as a means of varying the threshold pressure.

The ability to adjust the threshold pressure at which the pressure relief valve 70 opens is of particular benefit in racing vehicles in which a driver will often wish to "feather" the brakes. That is to say the driver may wish to hold the brakes at a point where a braking force is just being applied. This can be problem with differential master cylinders because the point at which the driver wishes to hold the brakes is often coincident with or close to the point at which the pressure relief valve 70 opens. Since the opening of the pressure relief valve 70 will cause a noticeable change in the feel of the brakes through the pedal, the driver may have difficulty in feathering the brakes at this point. The ability to adjust the threshold pressure at which the pressure relief valve 70 opens means that the switch-over or transition from the large to the small working chamber can be arranged to take place at a working pressure which is different from that which the driver needs to maintain in the brake system in order to feather the brakes. In a particularly advantageous arrangement, a mechanism can be provided to enable the threshold pressure to be adjusted remotely, either from within the vehicle or in response to a control signal transmitted from outside the vehicle.

Whereas the invention has been described in relation to what is presently considered to be the most practical and preferred embodiments, it is to be understood that the invention is not limited to the disclosed arrangements but rather is intended to cover various modifications and equivalent constructions included within the spirit and scope of the invention. Those skilled in the art will readily understand that the various aspects of the detailed design of the master cylinder can be varied. For example, the larger and smaller pistons 24, 28 could be provided as separate units rather than as part of an integral stepped piston. In addition, the two valve chambers need not be in direct fluid communication. Instead, each chamber could have a separate fluid connection with the first working chamber, provided that a movable member of the second valve is subject to a pressure differential when the pressure relief valve opens. Furthermore, while the switch-over valve is advantageously provided in the cylinder body in the embodiments described, at least part of the first and second fluid passageways and the switch-over valve could be provided in the piston assembly.

What is claimed is:

1. A differential hydraulic master cylinder having a cylinder body in which is provided a first working chamber and a second working chamber, the second working chamber having a smaller diameter than the first, the cylinder further having a first fluid passageway for fluidly connecting the first chamber with a source of ambient pressure and a pressure relief valve in the first passageway which is arranged to open to connect the first chamber with said source of ambient pressure when the pressure in the first chamber reaches a threshold value, and a second fluid passageway for fluidly connecting the first chamber with an outlet, a second valve located in the second passageway which is arranged to permit hydraulic fluid to flow from the first chamber to the outlet but to prevent hydraulic fluid from flowing in the reverse direction, at least when the pressure relief valve is open, the second valve and the pressure relief valve each comprising a movable valve member, the movable valve members of the two valves being mechanically interconnected, the second valve movable member comprising a piston located in a second valve chamber which forms part of the second fluid passageway, the piston carrying a lip seal for contact with the surface of the second valve chamber, the arrangement being such that, in use, fluid is able to flow from the first working chamber over the lip seal to the outlet but is prevented from flowing in the reverse direction by engagement of the lip seal with the surface of the second valve chamber.

2. The differential hydraulic master cylinder of claim 1, in which the mechanical interconnection is adapted to transfer forces between the movable valve members.

3. The differential hydraulic master cylinder of claim 1, in which the mechanical interconnection comprises a substantially rigid link between the movable valve members.

4. The differential hydraulic master cylinder of claim 3, in which the movable valve members are provided on a common valve spool.

5. The differential hydraulic master cylinder of claim 1, in which the master cylinder is configured so that, in use, when the pressure relief valve begins to open, a pressure differential is created across the movable member of the second valve, which pressure differential generates a force on the movable member of the second valve that is transmitted to the movable member of the pressure relief valve through the mechanical interconnection and which tends to move the movable member of the pressure relief valve in a direction to fully open the pressure relief valve.

6. The differential hydraulic master cylinder of claim 5, in which the master cylinder is configured so that, in use, the pressure relief valve is held open so long as the pressure differential across the movable member of the second valve is equal to or larger than the threshold value.

7. The differential hydraulic master cylinder of claim 1, in which the whole of the first and second fluid passageways are provided in the cylinder body.

8. The differential hydraulic master cylinder of claim 1, in which the pressure relief valve comprises the movable valve member and a corresponding seal member in the first fluid passage, the valve being configured so that in use, the movable valve member is movable from a closed position in which it contacts the corresponding seal member to close the first fluid passage and an open position in which it is spaced from the corresponding seal member.

9. The differential hydraulic master cylinder of claim 8, in which the corresponding seal member is a resilient ring seal mounted in a first valve chamber forming part of the first fluid passageway and the movable valve member is substantially rigid.

10. The differential hydraulic master cylinder of claim 1, in which the pressure relief valve comprises a valve spring which biases the movable member into a valve closed position, the threshold pressure at which the valve opens being determined by the spring force exerted by the valve spring.

11. The differential hydraulic master cylinder of 10, in which the spring force is adjustable.

12. The differential hydraulic master cylinder of claim 11, in which the spring reacts against a closure member which is adjustably mounted in the cylinder body to vary the spring force.

13. The differential hydraulic master cylinder of claim 11, in which the master cylinder further comprises a mechanism configured to enable the threshold pressure to be adjusted remotely from the master cylinder.

14. The differential hydraulic master cylinder of claim 1, comprising first valve chamber in the cylinder body, the first and second valve chambers being fluidly interconnected by a bore, the first valve chamber forming part of the first fluid passageway, the cylinder further including a valve spool extending through the bore into each of the first and second valve chambers, the valve spool carrying the movable valve member of the pressure relief valve within the first valve chamber and the movable valve member of the second valve within the second valve chamber, the valve spool being movable in an axial direction from an initial position in which the pressure relief valve movable member contacts a seal in the first valve chamber to close the first fluid passage to a position in which the pressure relief valve member is spaced from the seal and the first fluid passage is open, the valve spool being biased to the initial position by a valve spring.

15. The differential hydraulic master cylinder of claim 14, in which the first valve chamber is closed at one end by a closure member which is adjustably mounted to the cylinder body, the valve spring reacting between the closure member and the valve spool, the arrangement being such that the spring force applied by the valve spring to the valve spool can be varied by adjusting the position of the closure member within the cylinder body.

16. The differential hydraulic master cylinder of claim 1, in which the first and second working chambers are defined by means of a stepped bore in the cylinder body and a piston assembly, the piston assembly having a larger diameter piston portion received in a correspondingly sized larger diameter portion of the stepped bore to define the first working chamber and a smaller diameter piston portion received in a correspondingly sized smaller diameter portion of the stepped bore to define the second working chamber.

17. A vehicle braking system comprising a hydraulic master cylinder according to claim 1.

* * * * *

UNITED STATES PATENT AND TRADEMARK OFFICE
CERTIFICATE OF CORRECTION

| | | |
|---|---|---|
| PATENT NO. | : 7,895,837 B2 | Page 1 of 1 |
| APPLICATION NO. | : 12/072419 | |
| DATED | : March 1, 2011 | |
| INVENTOR(S) | : Richard Arnold Bass | |

It is certified that error appears in the above-identified patent and that said Letters Patent is hereby corrected as shown below:

Cover Page, add item (30) "Foreign Application Priority Data, GB 0704431 filed March 8, 2007".

Abstract, at line 57, please change "valve member (100, 102, 88; 122)" to --valve member (100, 102, 88, 122)--.

At column 2, line 27, please change "International" to --international--.

At column 2, line 37, please remove "non-return".

At column 9, line 63, please change "lion-return valve member 122" to --second valve member 122--.

At column 10, line 42, please change "70 will we" to --70 will be--.

Signed and Sealed this
Fourth Day of October, 2011

David J. Kappos
*Director of the United States Patent and Trademark Office*